United States Patent [19]
Ohgi

[11] Patent Number: 6,005,754
[45] Date of Patent: *Dec. 21, 1999

[54] RECORDING/REPRODUCING CASSETTE EQUIPPED WITH IDENTIFICATION SUBSTRATE

[75] Inventor: Takashi Ohgi, Miyagi, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,257

[22] Filed: Nov. 28, 1997

[30] Foreign Application Priority Data

Dec. 11, 1996 [JP] Japan .................................. 8-330749

[51] Int. Cl.$^6$ ................................................ G11B 23/087
[52] U.S. Cl. .......................................................... 360/132
[58] Field of Search ............................ 360/132; 242/347, 242/347.1

[56] References Cited

U.S. PATENT DOCUMENTS

| | | | |
|---|---|---|---|
| 4,769,731 | 9/1988 | Schoettle et al. | 360/132 |
| 5,481,426 | 1/1996 | Schoettle et al. | 360/132 |
| 5,541,796 | 7/1996 | Sawada | 360/132 |
| 5,561,573 | 10/1996 | Morita | 360/132 |
| 5,629,822 | 5/1997 | Rich et al. | 360/132 |
| 5,666,251 | 9/1997 | Fujii et al. | 360/132 |
| 5,791,578 | 8/1998 | Kurokawa et al. | 360/132 |

FOREIGN PATENT DOCUMENTS

| | | |
|---|---|---|
| 7-14346 | 1/1995 | Japan . |
| 8-145018 | 6/1996 | Japan . |

*Primary Examiner*—David D. Davis
*Attorney, Agent, or Firm*—Jay H. Maioli

[57] ABSTRACT

A recording/reproducing cassette equipped with an identification substrate is formed by joining together substantially rectangular upper and lower shells, with the identification substrate being placed therebetween at an appropriate position, wherein there is provided a temporary engagement device for maintaining the upper and lower shells in the joined state. The temporary engagement device consists of ribs or grooves or a combination of ribs and grooves provided on the upper and lower shells and/or the identification substrate.

2 Claims, 10 Drawing Sheets

RECORDING/REPRODUCING CASSETTE EQUIPPED WITH IDENTIFICATION SUBSTRATE

BACKGROUND OF THE INVENTION

1. Field of the Invention

The present invention relates to a recording/reproducing cassette of the type equipped with an identification substrate and, more specifically, to a recording/reproducing cassette equipped with a temporary engagement mechanism by means of which the upper and lower shells of the cassette are temporarily engaged with each other, with an identification substrate, which is arranged inside the cassette, being placed therebetween.

2. Description of the Related Art

Recording/reproducing cassettes, for example, magnetic tape cassettes, have been reduced in size and have become endowed with various functions in addition to the recording/reproduction of information on/from the magnetic tape. For example, there are recording/reproducing cassettes equipped with memory that makes it possible to indicate the information recorded on the tape and the length of the tape as well as a function by which it is possible to prevent the recorded information from being inadvertently erased.

FIG. 15 shows an example of a conventional recording/reproducing cassette. In the drawing, a magnetic tape cassette 1 includes: upper and lower shells 2 and 3 having a rectangular configuration; a color plate 4 accommodated in a rear corner of the upper and lower shells 2 and 3 for discriminating write-permit/write-inhibit; reel springs 5 symmetrically arranged on the ceiling of the upper shell 2 for applying a bias to the reels; take-up and supply reels 9 and 10 which are equipped with upper and lower reels 8 and 7, each having a hub around which a magnetic tape 6 is wound; a reel lock portion 11 for preventing the reels from rotating when the cassette is not being used; a safety tab 12 for controlling the writing/reading to/from the magnetic tape 6; an identification substrate 13 for storing information, for example, the kind of information recorded in the cassette; a lid lock 14 for controlling the opening and closing of the lid when the cassette is not being used; a lamp cap 16 for covering the top portion of a lamp hole 15 provided substantially at the center of the front side of the lower shell 3 and serving to detect the end of the tape; and a lid portion 17 for accommodating the magnetic tape 6 placed between the front side walls of the upper and lower shells 2 and 3.

The lid portion 17 comprises a rear lid 18 and a front lid 19 for holding the tape therebetween when the cassette is not being used, a top lid 20 for guiding the entire lid upwards, and a lid spring 21 which constantly biases the entire lid downwards, i.e., so as to close it. The lower shell 3 is equipped with a lock member accommodating portion 22 for accommodating the reel lock portion 11, and a substrate mounting portion 30 in a rear corner of the shells for accommodating the identification substrate 13.

The reel lock portion 11 incorporated in the lock member accommodating portion 22 provided in the rear central section of the lower shell 3, comprises a reel lock slider 23 which is caused to slide inwards when the cassette is not being used and which is caused to slide outwards when the cassette is being used, take-up and supply reel lock claws 24 and 25 mounted on either side of the reel lock slider 23, a slider spring 26 for applying a continuous inward bias on the reel lock slider 23, and a reel lock spring 27 for applying a bias to the take-up and supply reel lock claws 24 and 25 to move away from each other.

As shown in FIGS. 15 and 16, when assembling the reel lock portion 11, constructed as described above, one end of the slider spring 26 is first mounted to the reel lock slider 23, and the other end of the slider spring 26 is fitted from above into a spring engagement portion 28 provided on the rear wall of the lower shell 3, whereby the reel lock portion 11 is mounted to the lock member accommodating portion 22 of the lower shell 3. Then, shafts of the reel lock slider 23 are fitted into the take-up and supply reel lock claws 24 and 25, which are engaged with the reel lock spring 27. The reel lock portion 11, mounted as described above, is guided inwards by the slider spring 26 when the cassette is not being used. When the reel lock portion 11 is thus guided, the forward ends of the reel lock claws 24 and 25 are guided along guide grooves of the accommodating portion 22 and pressed against notched sections of the lower reels 7 of the reels 9 and 10, whereby the rotation of the reels 9 and 10 is prevented.

When the cassette is used, a release bar 29 enters from the bottom side of the cassette, as shown in FIG. 17, and causes the reel lock slider 23 to slide outwards against the bias of the slider spring 26, whereby the lock of the reels 9 and 10 is cancelled.

As shown in FIG. 16, the substrate mounting portion 30 consists of two chambers: a first accommodating portion 31 which is on the right-hand side in FIG. 16 and which is connected to the external connectors of electronic apparatus or the like, and a second accommodating portion 32 which is on the left-hand side and which accommodates the IC portion of the identification substrate 13 which is equipped with IC memory.

The first accommodating portion 31 is provided with a connection window portion 33 consisting of four windows that are open on the outside. At a longitudinal end of the first accommodating portion 31, there is provided an engagement portion 34 which is to be engaged with one end of the identification substrate 13. The second accommodating portion 32 is equipped with an engagement portion 36 which is connected to a reinforcing rib 35 and which is engaged with the other end of the identification substrate 13.

As shown in FIG. 18, like the upper and lower shells 2 and 3, which are formed of a plastic material such as ABS, the identification substrate 13, which is incorporated in the substrate mounting portion 30, is formed of a plastic material such as an epoxy resin or some other engineering plastic (POM or the like). The identification substrate 13 has a narrow and stepped configuration. The wider portion of the substrate constitutes an IC mounting portion 37, and the narrower portion thereof constitutes a terminal portion 38.

An IC chip 39 for storing information on the information recorded in the cassette and the recording/reproducing tape, etc. is mounted substantially at the center of the IC mounting portion 37, and the IC chip 39 is covered with a protective layer 40. The IC chip 39 is connected to the contact terminals of the terminal portion 38.

Four contact terminals are formed in alignment in the terminal portion 38, the terminals consisting of a grounding contact terminal GND, a clock contact terminal SCK, a data contact terminal SDA, and a power source contact terminal VDD, arranged in that order as from the outside.

When incorporating the identification substrate 13, constructed as described above, in the accommodating portion of the lower shell 3, the contact terminals are directed outwards, as shown in FIG. 16, and the longitudinal end portions are engaged with the grooves of the engagement portions 34 and 36 so that the memory mounting portion 37 can be accommodated in the second accommodating portion 32, and inserted from above. By thus inserting, the contact terminals of the terminal portion 38 of the identification substrate 13 equipped with the IC memory 39 are exposed to the exterior through the windows of the connection window portion 33. The memory mounting portion 37 of the substrate 13 is arranged such that it is accommodated in the second accommodating portion 32, and the upper shell 2 is placed from above. That is, the upper and lower end portions of the identification substrate 13 are placed between the upper and lower shells 2 and 3 and secured in position to complete the assembly.

When assembling the magnetic tape cassette, the various parts shown in FIG. 15, for example, the parts constituting the reel lock portion 11, i.e., the slider spring 26, the reel lock spring 27, the reel lock slider 23, and the take-up/supply reel lock claws 24 and 25 and the safety tab 12, the reels 9 and 10 with the tape wound around them, the identification substrate 13, etc. are placed at predetermined positions of the lower shell 3, and, in this condition, the upper shell 2 is placed on the lower shell 3, and pressed against it from above and screwed thereto to complete the assembly.

However, when assembling the above-described conventional magnetic tape cassette, if the various parts, in particular, the parts imparting a biasing force to the slider spring, the reel lock spring, etc. forming the reel lock portion are deviated from the predetermined positions, the mating portions of the upper and lower shells joined together are deviated from each other, or the parts come off, thereby interrupting the assembling process or generating a defective product. More specifically, when the slider spring 26 is in the normal state as shown in FIG. 17, it is accommodated in the spring engagement portion 28 of the lower shell 3 so as to be substantially flush with the upper end surface of the lower shell 3. However, if this slider spring 26A comes off upwards from the spring engagement portion 28 for some reason or other, it pushes the upper shell 2 upwards, with the result that the mating surfaces of the upper and lower shells joined together are deviated from each other, the mounted parts coming off, positional deviation, etc. being generated.

Thus, when the upper and lower shells are joined together with the various parts mounted therein, it is important that no accommodated parts are allowed to be detached or from come off. Further, the mating parts of the upper and lower shells should not be deviated from each other.

SUMMARY OF THE INVENTION

To overcome the above problem, there is provided, in accordance with the present invention, a recording/reproducing cassette of the type which is equipped with an identification substrate and which is formed by joining together substantially rectangular upper and lower shells, with the identification substrate being placed therebetween at an appropriate position, wherein the upper and lower shells and/or the identification substrate are/is provided with temporary engagement means for maintaining the upper and lower shells in the joined state.

In the recording/reproducing cassette equipped with an identification substrate, constructed as described above, when the upper and lower shells are joined together with the reel lock portion in which the reels and the biasing springs, etc. are incorporated, etc. being accommodated therein, the joined state can be maintained, so that the mating parts of the upper and lower shells are not easily deviated from each other, whereby it is possible to prevent the accommodated parts from being positionally deviated or coming off.

DETAILED DESCRIPTION OF THE PREFERRED EMBODIMENTS

Figure 15:
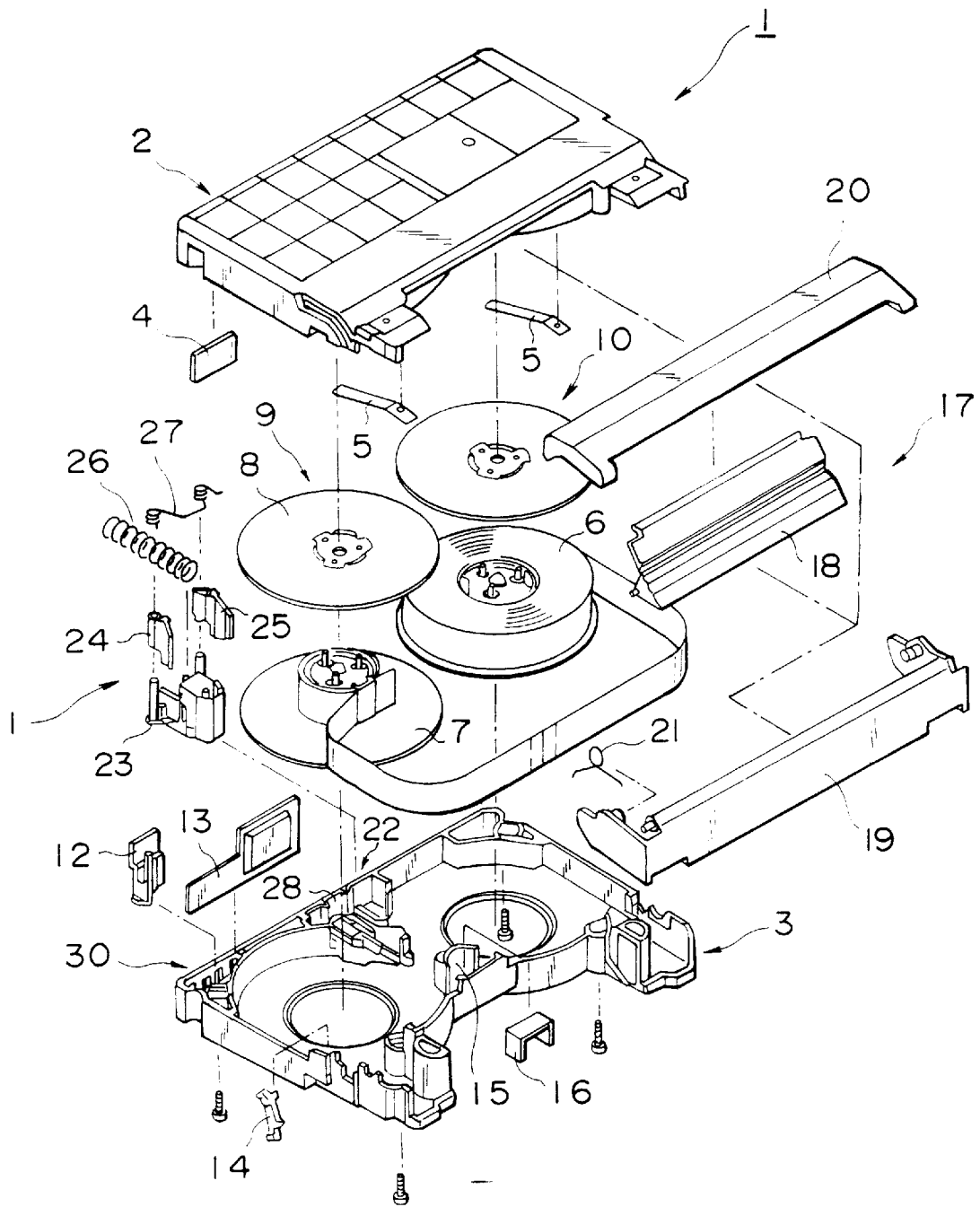
FIG. 15 is an exploded perspective view showing a conventional recording/reproducing cassette equipped with an identification substrate.

Next, a recording/reproducing cassette equipped with an identification substrate according to the present invention will be described with reference to the drawings. The recording/reproducing cassette itself is the same as the conventional cassette shown in FIG. 15. The present invention differs from the prior art in that there is provided a temporary engagement mechanism by means of which the upper and lower shells are temporarily engaged with each other with the identification substrate being placed therebetween. For the sake of clarity, the components which are the same as those of the prior art are indicated by the same reference numerals.

Figure 1:
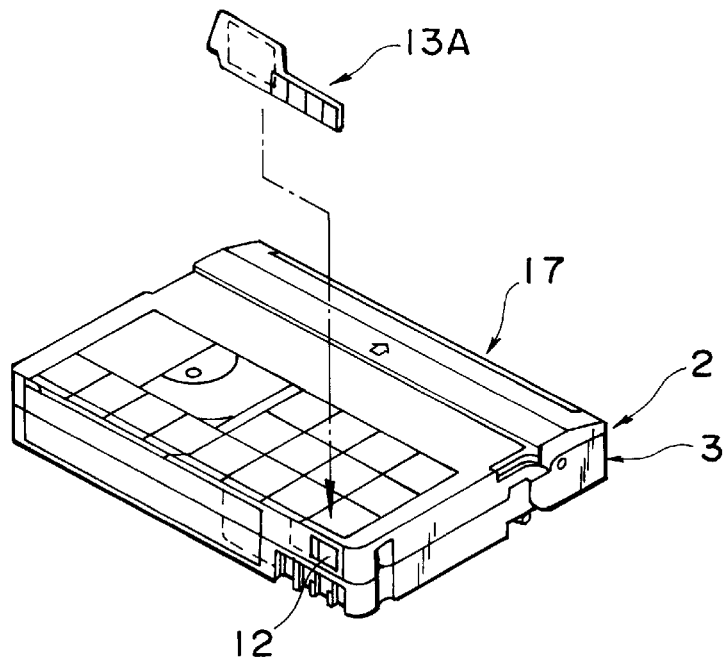
FIG. 1 is a general perspective view of a recording/reproducing cassette equipped with an identification substrate in accordance the present invention.
Figure 2:
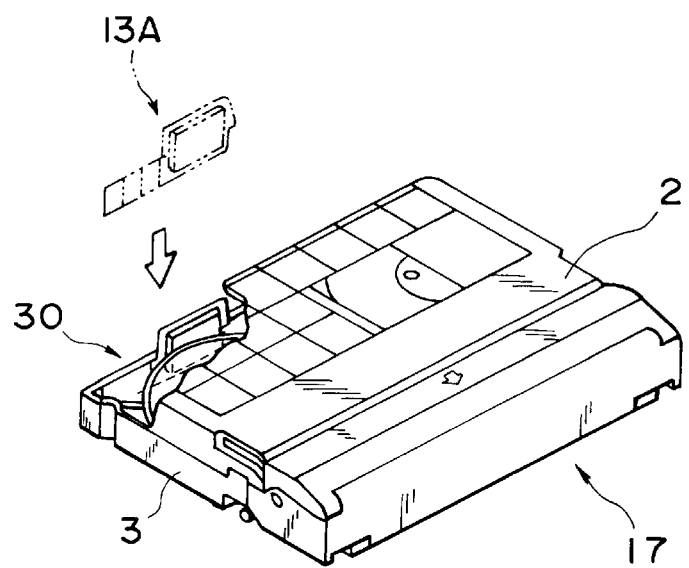
FIG. 2 is a partially cutaway perspective view of the recording/reproducing cassette, showing the essential part where the identification substrate is mounted.

FIGS. 1 and 2 show a recording/reproducing cassette equipped with an upper/lower-shell temporary engagement mechanism according to the first embodiment. As shown in FIGS. 1 and 2, the cassette consists of rectangular upper and lower shells 2 and 3, in which a pair of tape reels, with a magnetic tape serving as a recording medium being wound around them, are mounted.

On the front side of the recording/reproducing cassette, there is provided a lid portion 17, which opens and closes when the recording/reproducing cassette is attached to an electronic apparatus, such as a digital video tape recorder, and guides the tape to the recording/reproducing mechanism of the electronic apparatus. A safety tab 12 for preventing the recorded information from being inadvertently erased is arranged in a corner of the rear side surface of the upper shell 2, where a reinforcing rib is formed.

At a position of the lower shell 3 substantially corresponding to the safety tab 12, there is provided a substrate mounting portion 30 where an identification substrate (IC memory substrate) 13A equipped with IC memory or an identification substrate equipped with no IC memory can be mounted.

Figure 3:
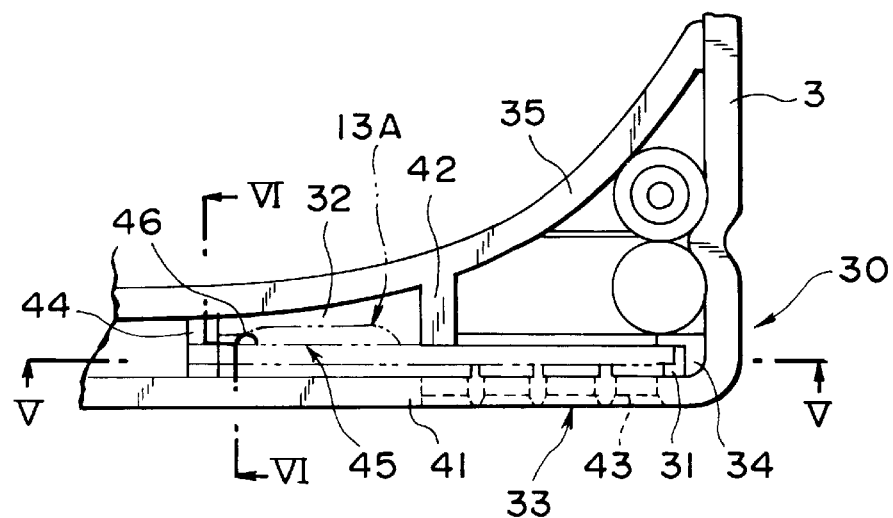
FIG. 3 is an enlarged plan view showing the essential part of the substrate mounting portion of the lower shell, where the identification substrate of the first embodiment is mounted.
Figure 16:
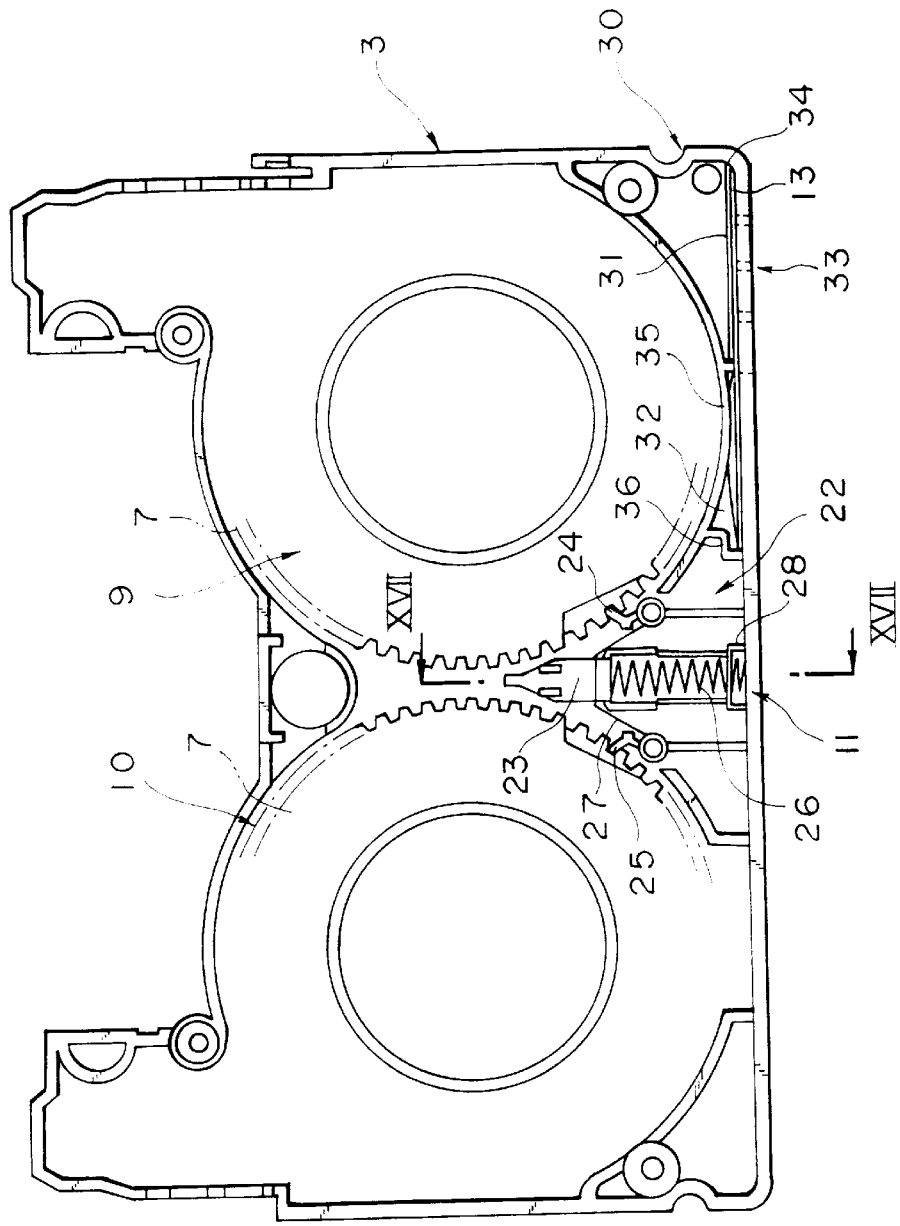
FIG. 16 is a plan view showing how a reel lock portion and the identification substrate are mounted in the lower shell of the conventional cassette.
Figure 17:
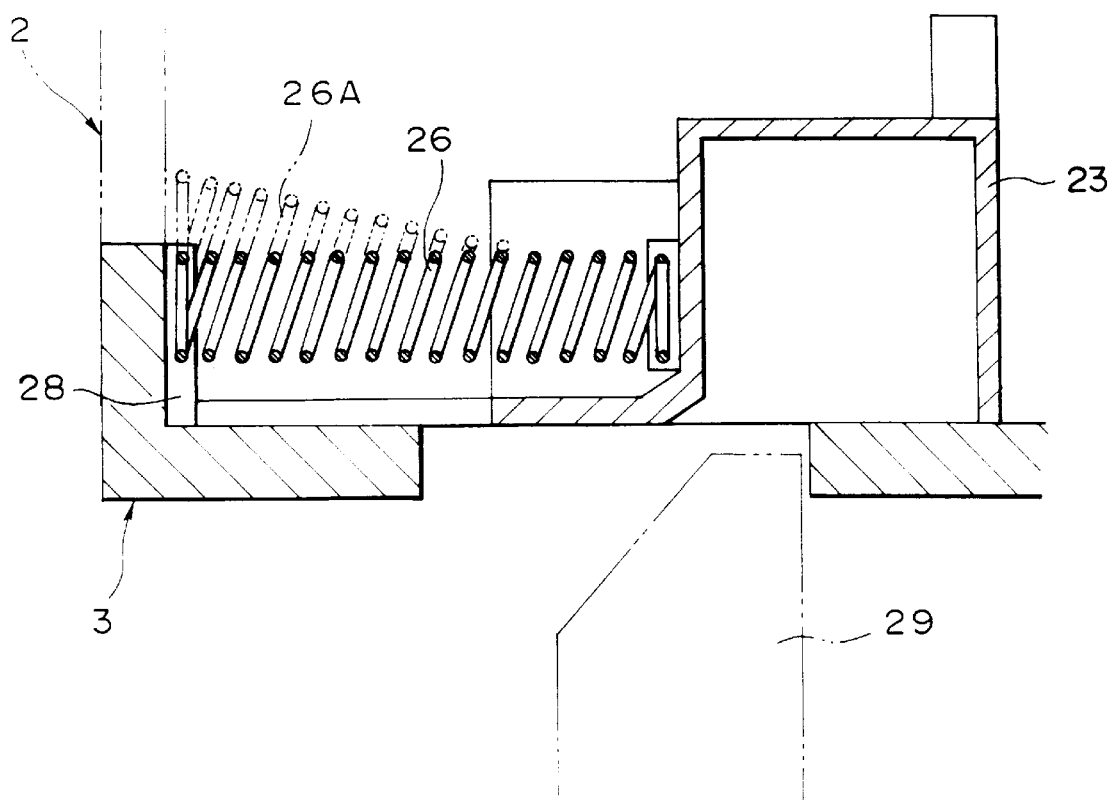
FIG. 17 is a sectional view taken along the line X—X of FIG. 16.

The substrate mounting portion 30 has substantially the same construction as the above-described conventional substrate mounting portion shown in FIG. 16. That is, as shown in FIG. 3, the substrate mounting portion 30 is formed between a reinforcing rib 35 provided in a rear side corner of the lower shell 3 and the side wall 41, and extends along the longitudinal direction of the side wall 41. The substrate mounting portion 30 consists of two chambers on either side of a partition 42: a first accommodating portion 31 and a second accommodating portion 32.

As shown in FIG. 3, the first accommodating portion 31 is provided with a connection window portion 33 consisting of four windows 43 formed in alignment in the side wall 41 and an engagement portion 34 which is provided at the right-hand end and which engages with the end portion of the identification substrate 13A.

The second accommodating portion 32 has a lower engagement portion 44 which is formed at a position where the reinforcing rib 35 and the side wall 41 cross each other, that is, at the end of the longitudinally formed second accommodating portion 32, so as to be connected to the reinforcing rib 35 and which engages with an end portion of the identification substrate 13A, and a press-fit portion 45 which is provided at the bottom of the lower engagement portion 44 and holds the bottom end portion of the identification substrate. In this press-fit portion 45, there is provided a rib 46 formed so as to leave a gap corresponding to the thickness of the identification substrate 13A.

Figure 5:
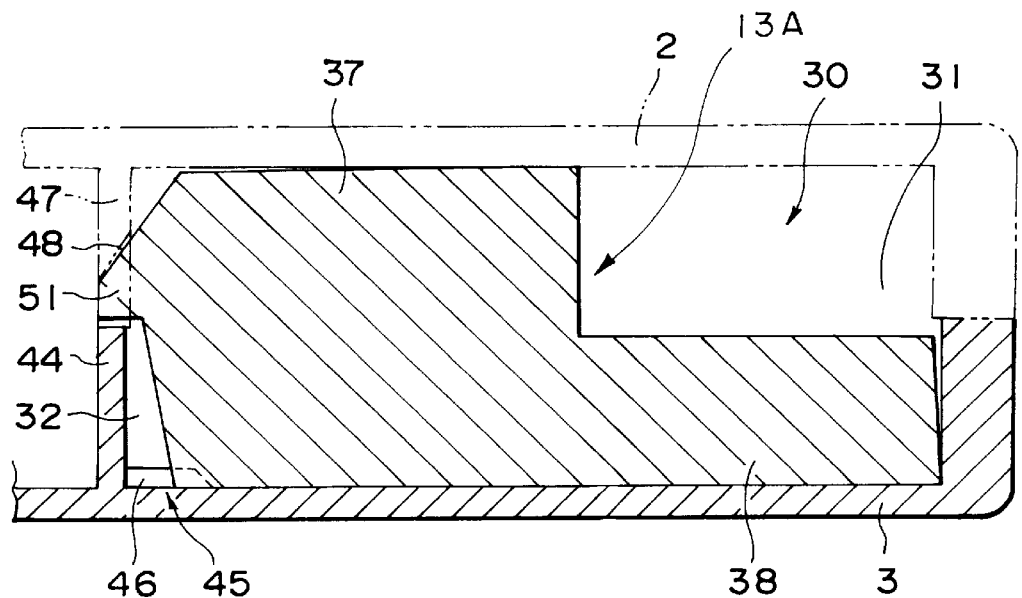
FIG. 5 is a sectional view taken along the line A—A of FIG. 3, showing how the identification plate is press-fitted in the upper and lower shells of the first embodiment as a temporary engagement portion to effect a temporary engagement.
Figure 6:
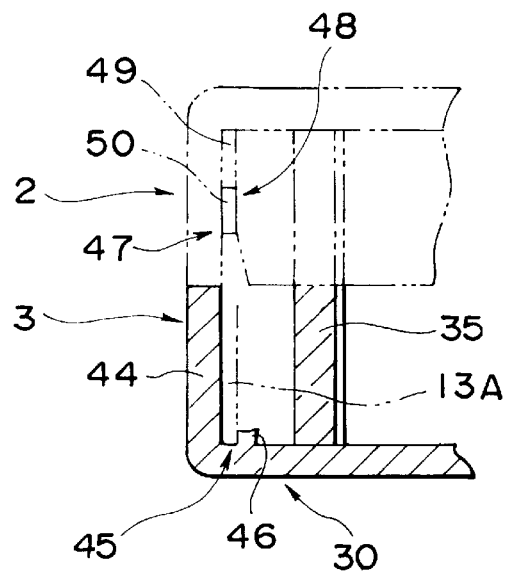
FIG. 6 is a sectional view taken along the line B—B of FIG. 3, showing how the identification plate is press-fitted in the upper and lower shells of the first embodiment as a temporary engagement portion to effect a temporary engagement.

As shown in FIGS. 5 and 6, the upper shell 2 has an upper engagement portion 47 which is opposed to the lower engagement portion 44 connected to the reinforcing rib 35, formed in the same configuration as the reinforcing rib 35 of the lower shell 3.

The upper engagement portion 47 is provided with a protrusion press-fit portion 48 formed at a position corresponding to the upper position of the press-fit portion 45 of the lower shell 3. The protrusion press-fit portion 48 has a groove 49 in which a protrusion 51 of the identification substrate 13A is press-fitted. The groove 49 has a size large enough to accommodate the protrusion 51 of the identification substrate 13A and is formed as an inwardly tapered gap 50.

Figure 4:
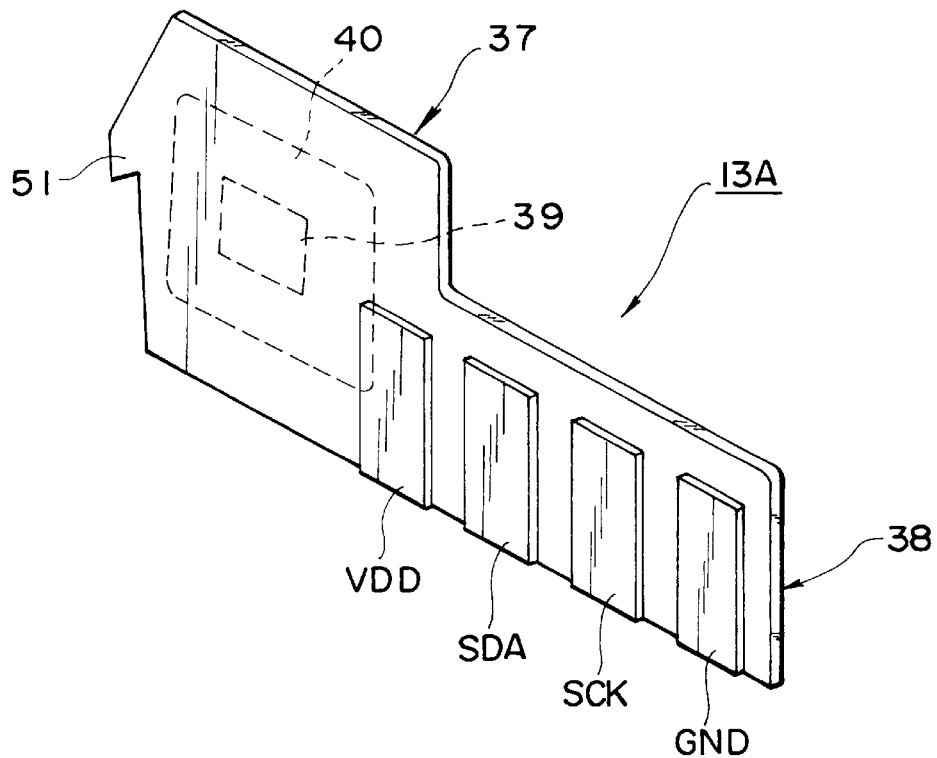
FIG. 4 is a perspective view of the identification plate of the first embodiment.
Figure 18:
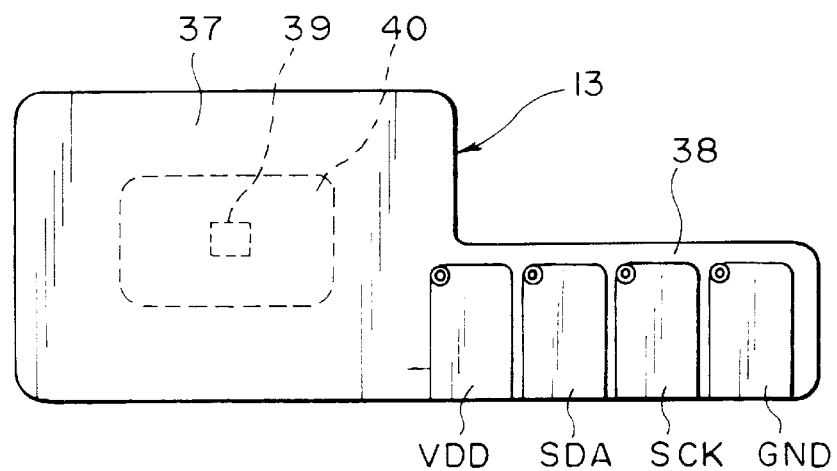
FIG. 18 is a plan view of a conventional identification substrate.

As shown in FIG. 4, like the conventional identification substrate 13 equipped with IC memory shown in FIG. 18, the identification substrate 13A has a rectangular configuration, with a step being formed substantially at the center. In FIG. 4, the left-hand portion is the IC mounting portion 37, and the right-hand portion is the terminal portion 38. An IC chip 39 protected by a protective layer 40 is mounted on the IC mounting portion 37, which has a protrusion 51 formed as a tapered section substantially in the middle of the left-hand side end surface thereof. In the terminal portion 38, four terminals are formed in alignment: a power source terminal VDD, a signal terminal SDA, a clock terminal SCK, and a ground terminal GND, arranged in that order as from the left-hand side in FIG. 4.

When mounting the identification substrate 13A, constructed as described above, as shown in FIGS. 5 and 6, the identification substrate 13A is fitted from above into the substrate mounting portion 30 of the lower shell 3, the terminal portion 38 being accommodated in the first accommodating portion 31, the IC mounting portion 37 being accommodated in the second accommodating portion 32, whereby the bottom end side of the IC mounting portion 37 of the identification substrate 13A enters the groove of the press-fit portion 45 and is held therein. In this condition, the upper shell 2 is placed on the lower shell 3, whereby the position of the protrusion 51 of the identification substrate 13A is controlled as it enters the protrusion press-fit portion 48 of the upper engagement portion 47. Further, when the upper shell 2 is pressed, the protrusion 51 enters the gap 50 as it is controlled by the press-fit portion 45 of the lower shell 3. That is, when the upper shell 2 is placed on the lower shell 3 from above to join them together, the identification substrate 13A serves as a temporary engagement member for both the upper and lower shells 2 and 3 as it is positionally controlled by the press-fit portion 45 and the protrusion press-fit portion 48 of the upper and lower shells 2 and 3.

Next, a recording/reproducing cassette according to the second embodiment of the present invention, in which the identification substrate also serves as a temporary engagement mechanism for the upper and lower shells, will be described with reference to FIGS. 7 through 10.

Figure 7:
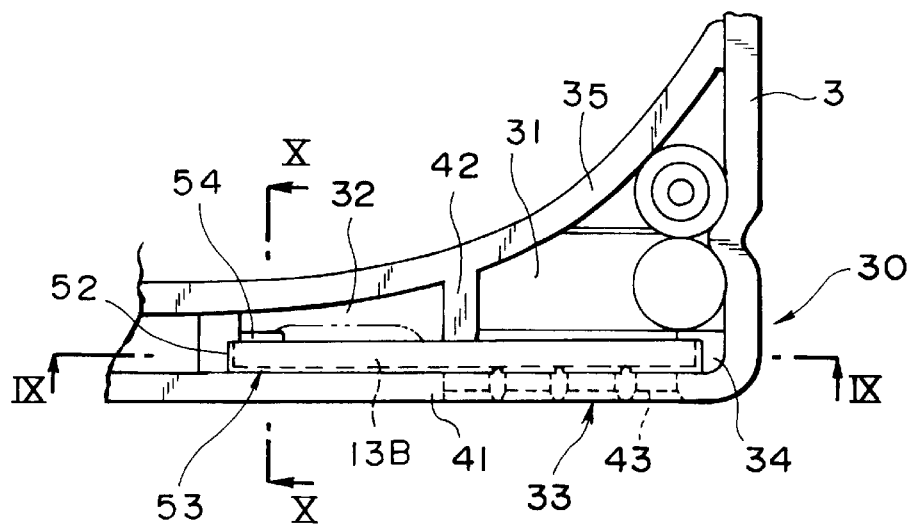
FIG. 7 is an enlarged plan view showing the essential part of the substrate mounting portion of the lower shell, where the identification substrate of a second embodiment is mounted.

As shown in FIG. 7, the substrate mounting portion 30 provided in the lower shell 3, to which the identification substrate 13B is attached, has a construction similar to that described with reference to the first embodiment shown in FIG. 3. The substrate mounting portion 30 is defined between the reinforcing rib 35 provided in a rear side corner of the lower shell 3 and the side wall 41, and consists of two narrow chambers: the first accommodating portion 31 and the second accommodating portion 32 arranged on either side of the partition 42. The first accommodating portion 31 has the same construction as that of the first embodiment, so the components which are the same as those of the first embodiment are indicated by the same reference numerals, and a description thereof will be omitted.

In the second accommodating portion 32, a groove 52 engaged with one end of the identification substrate 13B and a rib-like lower press-fit portion 53 connected thereto are provided at a position where the reinforcing rib 35 and the side wall 41 meet, that is, at the end of the longitudinally formed second accommodating portion 32. The lower press-fit portion 53 is provided with a rib 54 which is inside the groove 54 and which holds the lower end portion of the identification substrate 13B.

Figure 9:
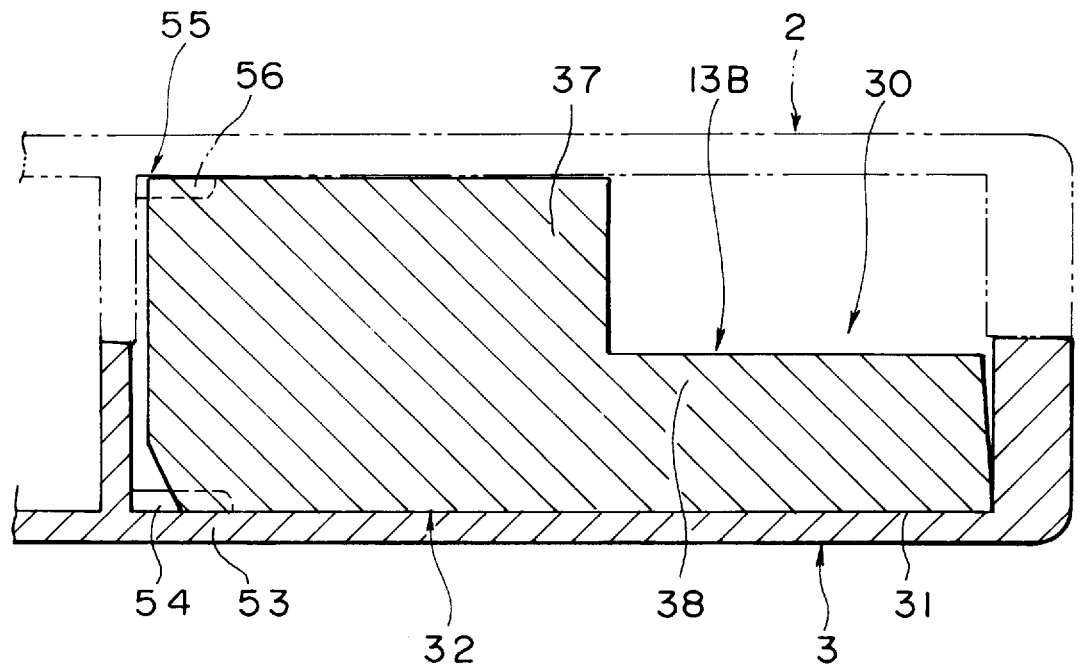
FIG. 9 is a sectional view taken along the line C—C of FIG. 7, showing how the identification plate is press-fitted in the upper and lower shells of the second embodiment as a temporary engagement portion to effect a temporary engagement.
Figure 10:
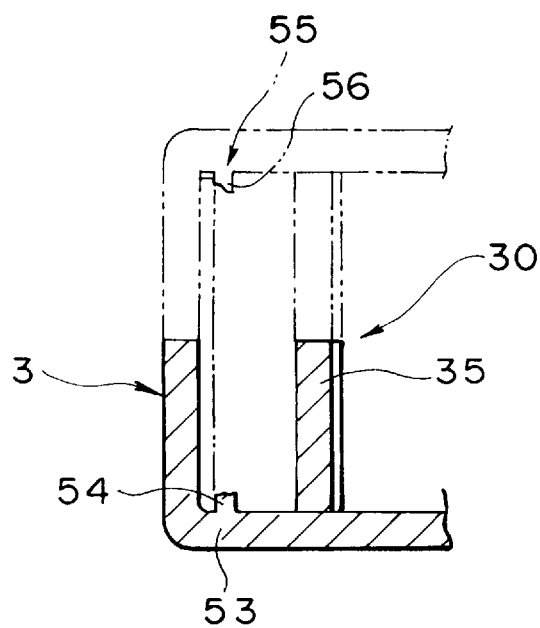
FIG. 10 is a sectional view taken along the line D—D of FIG. 7, showing how the identification plate is press-fitted in the upper and lower shells of the second embodiment as a temporary engagement portion to effect a temporary engagement.

As shown in FIGS. 9 and 10, the upper shell 2 is provided with an upper press-fit portion 55 which is formed in the same configuration as the reinforcing rib 35 of the lower shell 3 and which holds the upper end portion of the identification substrate 13B at a position opposed to the lower press-fit portion 53 of the lower shell 3. Like the lower press-fit portion 53 of the lower shell 3, the upper press-fit portion 55 is provided with a rib 56 defining a gap for holding the upper end portion of the identification substrate 13B.

Figure 8:
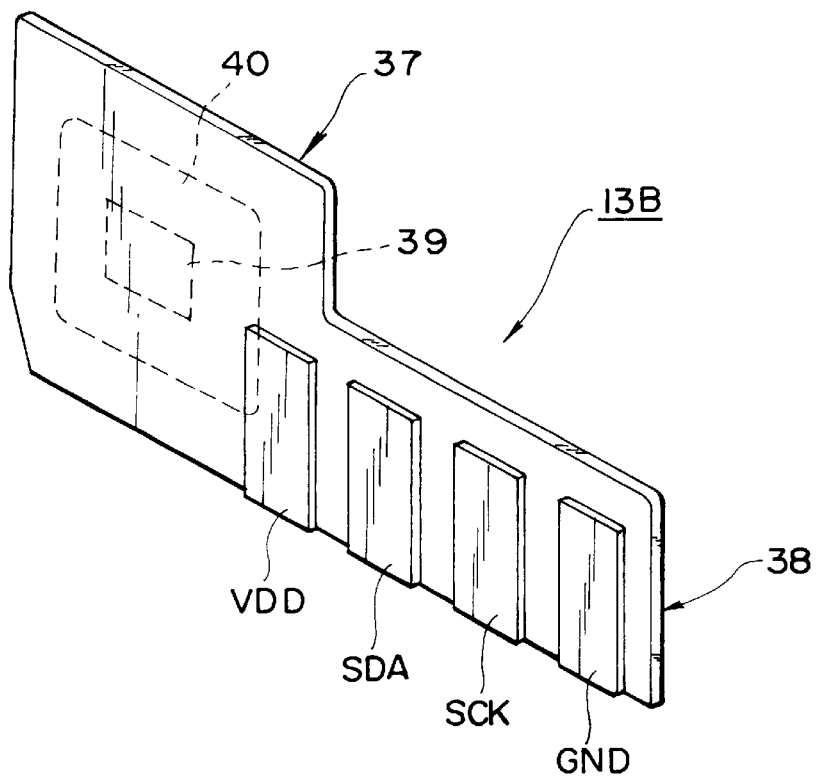
FIG. 8 is a perspective view of the identification plate of the second embodiment.

As shown in FIG. 8, substantially like the conventional identification substrate 13 equipped with IC memory shown in FIG. 18, the identification substrate 13B has a rectangular configuration with a step being formed substantially in the middle. In FIG. 8, the left-hand side portion is the IC mounting portion 37, and the right-hand side portion is the terminal portion 38. The IC chip 39 protected by the protective layer 40 is attached to the IC mounting portion 37, and the section from substantially the middle to the lower end of the left-hand end surface is tapered. In the terminal portion 38, four terminals are formed in alignment: a power source terminal VDD, a signal terminal SDA, a clock terminal SCK, and a grounding terminal GND, arranged in that order as from the left in the drawing.

As shown in FIGS. 9 and 10, when mounting the identification substrate 13B, constructed as described above, insertion from above the substrate mounting portion 30 of the lower shell is effected, with the terminal portion 38 being press-fitted into the first accommodating portion 31 and the IC mounting portion 37 being press-fitted into the second accommodating portion 32. Then, the bottom end side of the IC mounting portion 37 of the identification substrate 13B is fitted in the groove formed by the rib 54 of the lower press-fit portion 53 and held therein. In this condition, the upper shell 2 is placed from above on the lower shell 3, whereby the upper end portion of the identification substrate 13B is fitted into the groove formed by the rib 56 of the upper press-fit portion 55 and held therein to be thereby positionally controlled. That is, when the upper shell 2 is joined from above to the lower shell 3, the upper and lower end portions of the identification substrate 13B are held by the upper press-fit portion 55 and the lower press-fit portion 53, so that the identification substrate serves as a temporary engagement member for both the upper and lower shells 2 and 3.

Next, a recording/reproducing cassette according to the third embodiment of the present invention, in which the identification substrate also serves as a temporary engagement mechanism for the upper and lower shells, will be described with reference to FIGS. 11 through 14.

Figure 11:
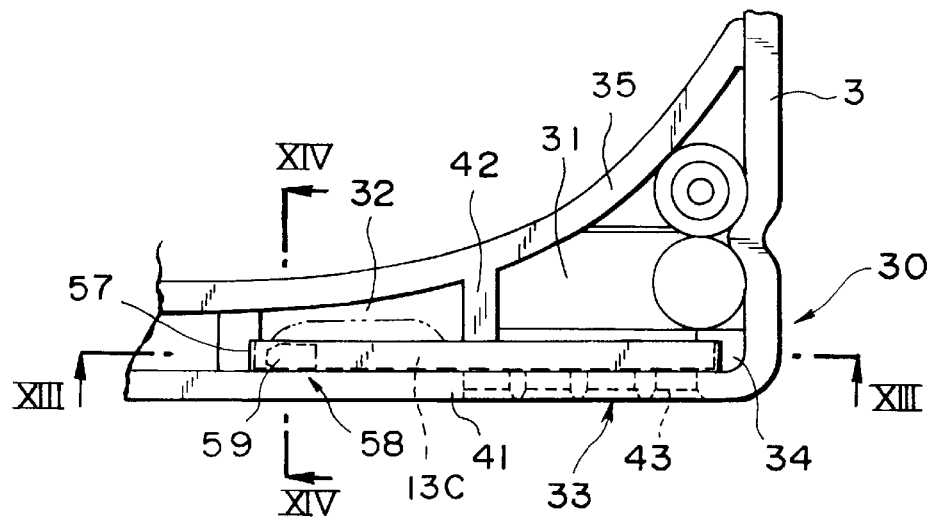
FIG. 11 is an enlarged plan view showing the essential part of the substrate mounting portion of the lower shell, where the identification substrate of a third embodiment is mounted.

As shown in FIG. 11, the substrate mounting portion 30 provided in the upper and lower shells 2 and 3, to which the identification substrate 13C is attached, has a construction similar to that described with reference to the first embodiment. The substrate mounting portion 30 is defined between the reinforcing rib 35 provided in a rear side corner of the lower shell 3 and the side wall 41, and consists of two narrow chambers: the first accommodating portion 31 and the second accommodating portion 32 arranged on either side of the partition 42. The first accommodating portion 31 has the same construction as that of the first embodiment, so the components which are the same as those of the first embodiment are indicated by the same reference numerals, and a description thereof will be omitted.

In the second accommodating portion 32, a groove 57 engaged with an end of the identification substrate 13C and a lower press-fit portion 58 close to this groove 57 are provided at a position where the reinforcing rib 35 and the side wall 41 meet, that is, at the end of the longitudinally formed second accommodating portion 32. The lower press-fit portion 58 is provided with a groove 59 into which the lower end of the identification substrate 13C is to be press-fitted.

Figure 13:
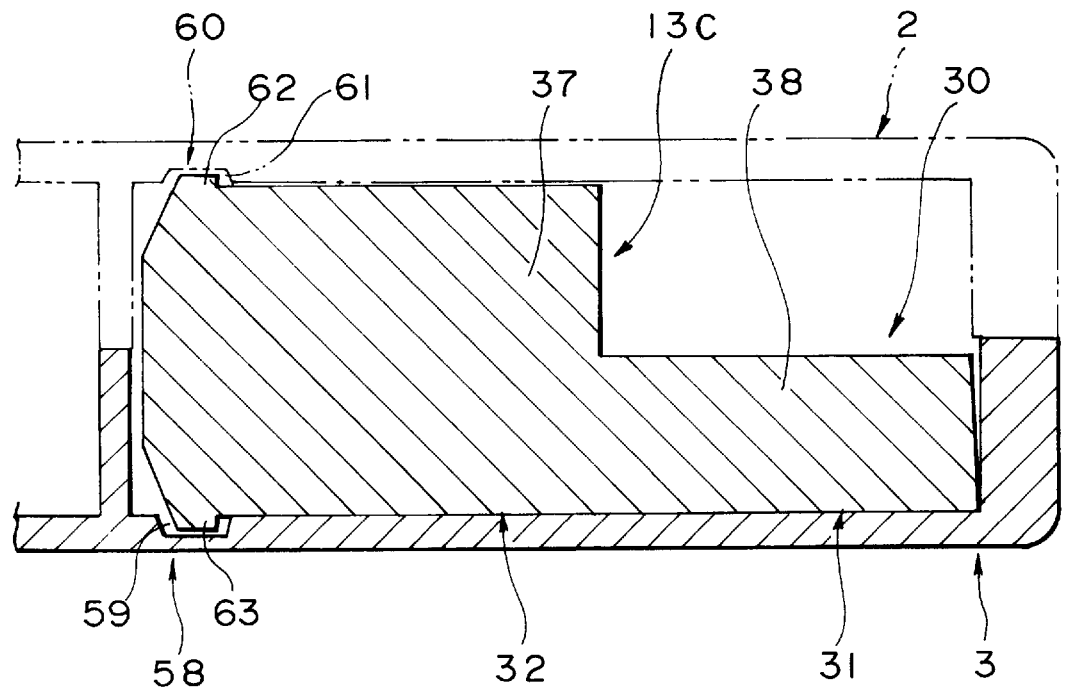
FIG. 13 is a sectional view taken along the line E—E of FIG. 11, showing how the identification plate is press-fitted in the upper and lower shells of the third embodiment as a temporary engagement portion to effect a temporary engagement.
Figure 14:
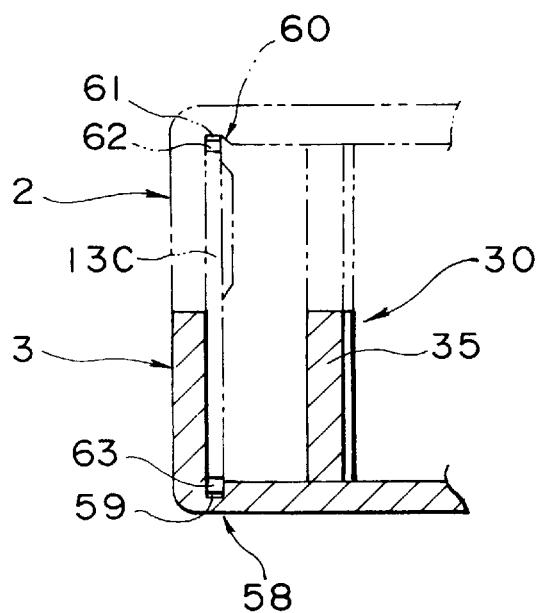
FIG. 14 is a sectional view taken along the line F—F of FIG. 11, showing how the identification plate is press-fitted in the upper and lower shells of the third embodiment as a temporary engagement portion to effect a temporary engagement.

As shown in FIGS. 13 and 14, the upper shell 2 is provided with an upper press-fit portion 60 which is formed in the same configuration as the reinforcing rib 35 of the lower shell 3 and provided at a position opposed to the lower press-fit portion 58 of the lower shell 3. The upper press-fit portion 60 is provided with a groove 61 into which the upper end portion of the identification substrate 13C is to be press-fitted.

Figure 12:
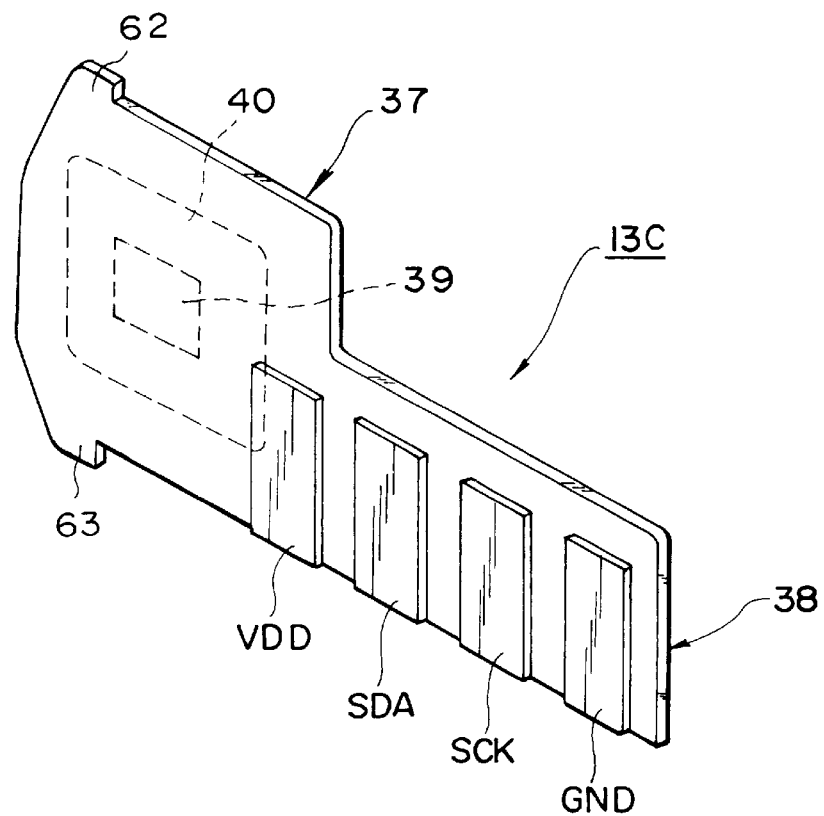
FIG. 12 is a perspective view of the identification plate of the third embodiment.

As shown in FIG. 12, substantially like the conventional identification substrate 13 equipped with IC memory shown in FIG. 18, the identification substrate 13C has a rectangular configuration with a step being formed substantially in the middle. In FIG. 12, the left-hand side portion is the IC mounting portion 37, and the right-hand side portion is the terminal portion 38. The IC mounting portion 37 is provided with protrusions 62 and 63 of a predetermined length at upper and lower positions of the left-hand end portion thereof. The upper and lower sections of the left-hand end surface of the IC mounting portion 37 are tapered. In the terminal portion 38, four terminals are formed in alignment: a power source terminal VDD, a signal terminal SDA, a clock terminal SCK, and a grounding terminal GND, arranged in that order as from the left in the drawing.

As shown in FIGS. 13 and 14, when mounting the identification substrate 13C, constructed as described above, insertion from above the substrate mounting portion 30 of the lower shell 3 is effected, with the terminal portion 38 being press-fitted into the first accommodating portion 31 and the IC mounting portion 37 being press-fitted into the second accommodating portion 32. Then, the protrusion 63 at the bottom end of the IC mounting portion 37 of the identification substrate 13C is press-fitted in the groove 59 of the lower press-fit portion 58 and held therein in a positionally controlled state. In this condition, the upper shell 2 is placed from above on the lower shell 3, whereby the protrusion 62 at the upper end of the identification substrate 13C is fitted into the groove 61 of the upper press-fit portion 60 at the upper end of the identification substrate 13C and held therein in a positionally controlled state. That is, when the upper shell 2 is joined from above to the lower shell 3, the protrusions 62 and 63 of the upper and lower end portions of the identification substrate 13C are press-fitted in the upper press-fit portion 62 and the lower press-fit portion 58 of the upper and lower shells 2 and 3 and held therein, so that the identification substrate serves as a temporary engagement member for both the upper and lower shells 2 and 3.

As described with reference to the first through third embodiments, the identification substrates 13A, 13B and 13C and/or the upper and lower shells 2 and 3 are provided with ribs 46, 54 and 56, grooves 49, 59 and 61, etc., and a temporary engagement is effected when the upper and lower shells 2 and 3 are joined together, with the identification substrates 13A, 13B or 13C being placed therebetween, whereby it is possible to perform assembly without the parts mounted in the upper and lower shells 2 and 3, for example, the reel lock spring, coming off through the gap between the upper and lower shells 2 and 3 or the mating surfaces of the upper and lower shells 2 and 3 being positionally deviated. Thus, the present invention is not restricted to the above-described first through third embodiments. The invention is naturally applicable to any type of temporary engagement mechanism for the upper and lower shells 2 and 3 in which the identification substrate placed therebetween serves as an engagement element.

As described above, in the recording/reproducing cassette equipped with an identification substrate of the present invention, the identification substrate placed between the upper and lower shells serves as a temporary engagement means for the upper and lower shells, whereby a temporary engagement can be effected when the upper and lower shells are joined together, and the generation of a gap between the upper and lower shell can be prevented. Further, it is possible to prevent the coming off of parts accommodated in the shells and positional deviation of the shells, thereby achieving an improvement in terms of productivity and product quality.

Further, since the identification substrate placed between the upper and lower shells serves as the temporary engagement means, there is no need to provide a separate temporary engagement means. Further, the temporary engagement means can be provided without having to adopt a complicated structure, so that it is possible, for example, to enhance the reliability of the die, etc.

What is claimed is:

1. A recording/reproducing cassette formed by joining together substantially rectangular upper and lower shells and equipped with an identification substrate fixed therebetween, the cassette comprising engagement means including:

a press fit groove formed in said lower shell and having a lower edge of said identification substrate held therein, a press fit portion formed in said upper shell for receiving an upper edge of said identification substrate therein, whereby said lower shell and said upper shell are aligned, a triangular-shaped protrusion formed on a side edge of said identification substrate, and a notch formed on a side wall of one of said upper and lower shells adapted to receive said protrusion of said identification substrate, wherein said upper and lower shells are maintained in an aligned state by said upper and lower edges of said identification substrate fitted into said press-fit portion and said press fit groove, respectively, and said upper and lower shells are maintained in a joined state following said aligned state with said triangular-shaped protrusion fitted into said notch.

2. A method for assembling a recording/reproducing cassette including an identification substrate having a triangular-shaped protrusion formed on a side edge thereof, and upper and lower shells including a press-fit portion and a press-fit groove, respectively, said upper shell having a notch formed on a side wall thereof adapted to receive said triangular-shaped protrusion of said identification substrate, said method for assembling including the steps of:

fitting a lower edge of said identification substrate into said press-fit groove of said lower shell;

aligning said upper shell on said lower shell by placing an upper edge of said identification substrate into said press fit portion formed in said upper shell; and joining said upper and lower shells by pressing said upper shell toward said lower shell so that the triangular-shaped protrusion of said identification substrate enters the notch in the side wall of said upper shell, so that said identification substrate is fixedly held between said lower shell and said upper shell.

* * * * *